No. 717,260. Patented Dec. 30, 1902.
R. M. OATES.
STEAM GENERATOR.
(Application filed Aug. 8, 1902.)
(No Model.) 3 Sheets—Sheet 3.

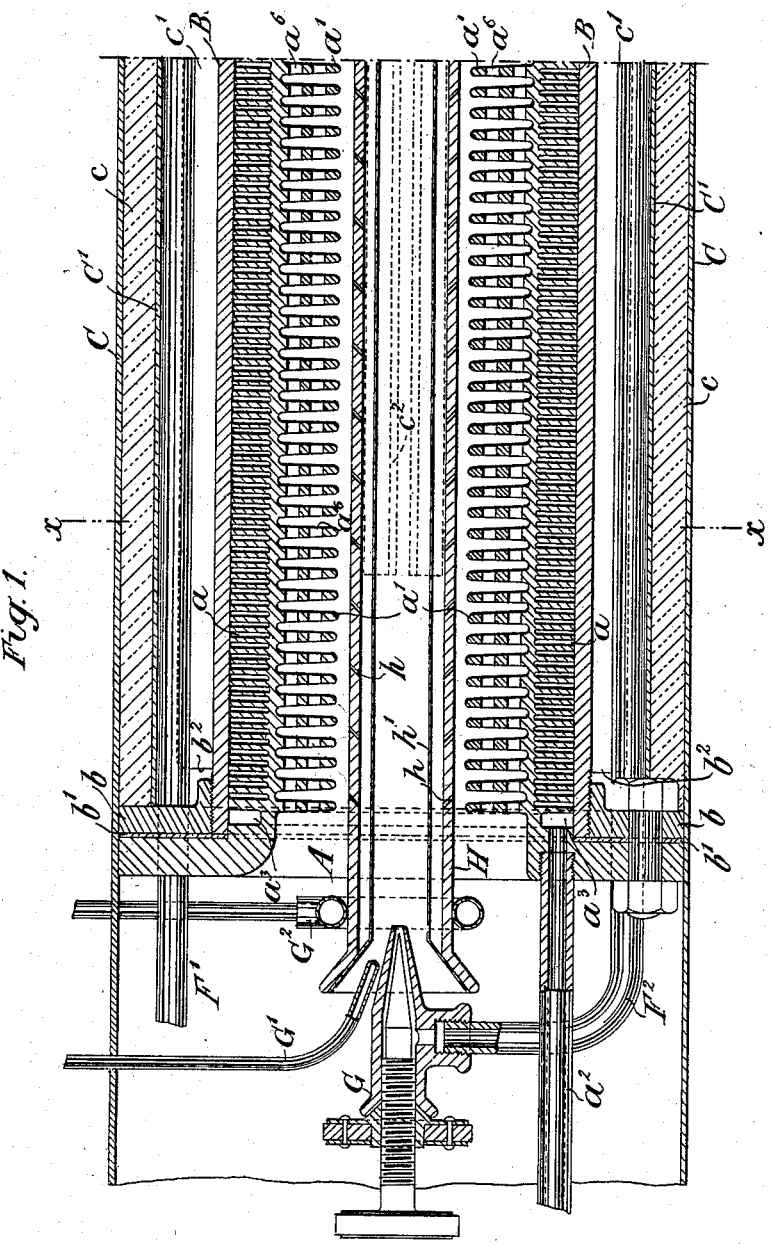

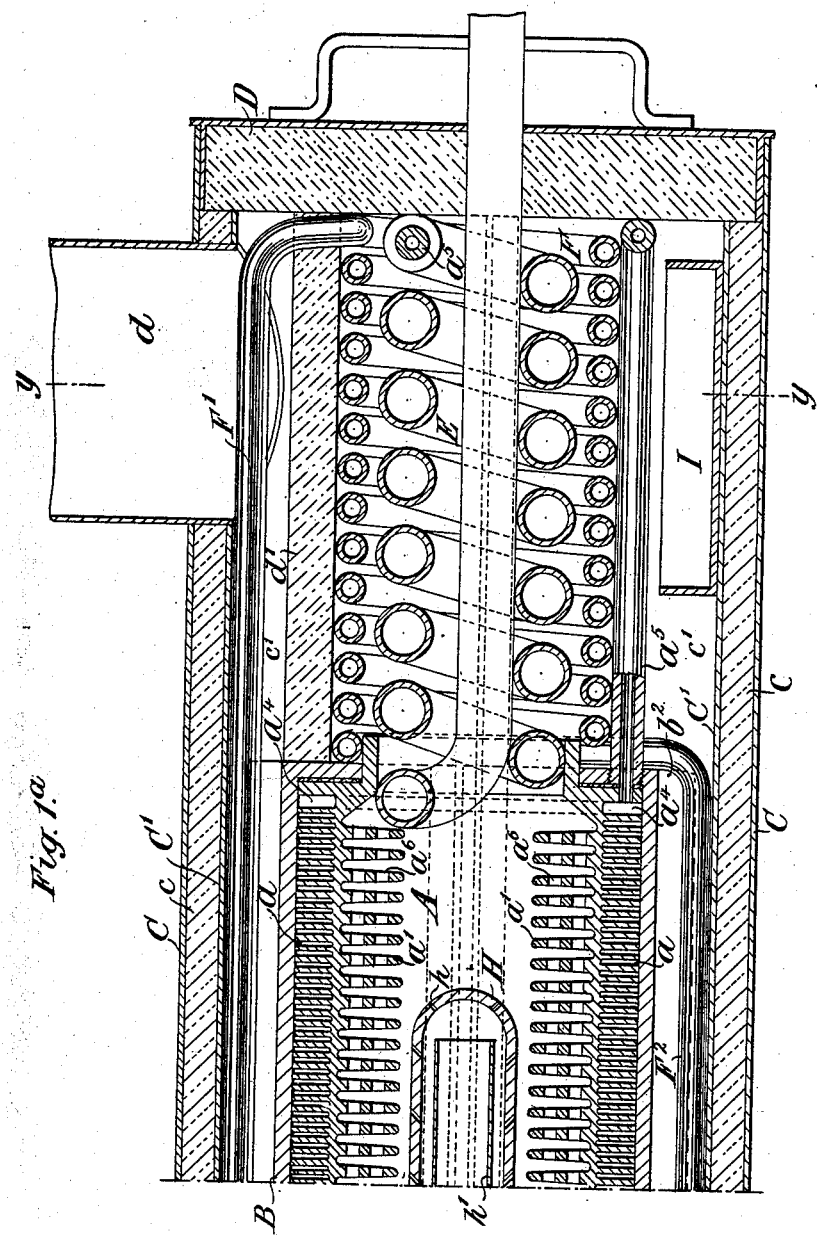

WITNESSES: INVENTOR:
Costantino Crigoni Randolph Mitchell Oates
Cesare Burattini

UNITED STATES PATENT OFFICE.

RANDOLPH MITCHELL OATES, OF PARIS, FRANCE, ASSIGNOR TO THE FRANCIS EYRE COMPANY, OF NEW YORK, N. Y.

STEAM-GENERATOR.

SPECIFICATION forming part of Letters Patent No. 717,260, dated December 30, 1902.

Application filed August 8, 1902. Serial No. 118,940. (No model.)

*To all whom it may concern:*

Be it known that I, RANDOLPH MITCHELL OATES, a subject of the King of Great Britain and Ireland, residing at 63 Rue Manin, Paris, 19e, France, have invented an Improved Steam-Generator, of which the following is a specification.

This invention relates to steam-generators of the type ordinarily termed "flash-boilers," wherein liquid fuel is used, the objects being to simplify the construction, whereby inspection is facilitated and the apparatus is rendered more efficient and certain in its operation.

The apparatus is particularly, but not exclusively, designed for employment with automobiles.

A steam-generator constructed according to my improved method is illustrated in the accompanying drawings, whereof—

Figure 5:
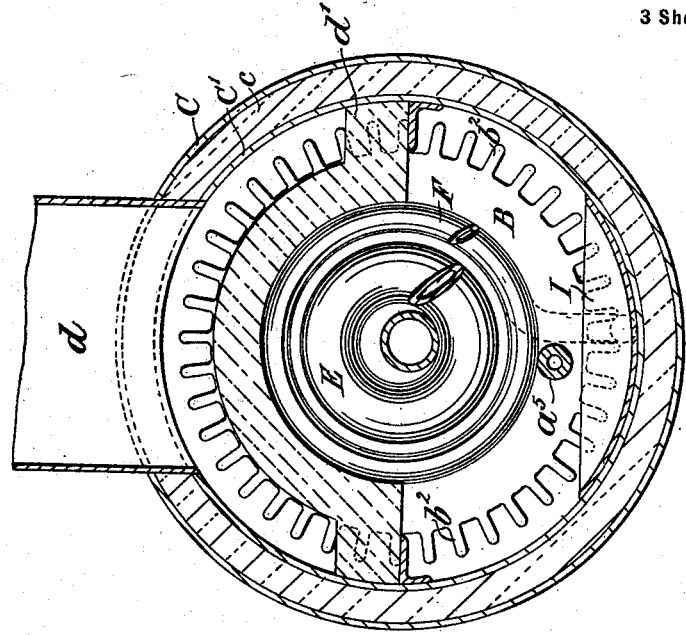
Figure 2:
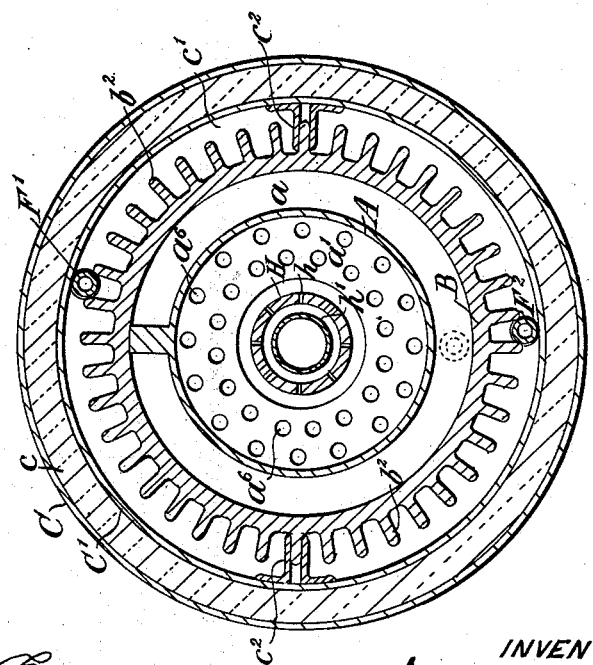

Figures 1 and $1^a$ represent the generator in longitudinal section, Fig. $1^a$ being simply a continuation of Fig. 1. Fig. 2 is a transverse section on the line $x\,x$ in Fig. 1, and Fig. 3 a similar section on the line $y\,y$ in Fig. $1^a$.

The apparatus comprises an interior flanged tube A, which may be of cast-iron and which is formed or provided on its exterior surface with a spiral groove $a$. This latter extends approximately the entire length of the tube and is preferably made as narrow as possible and of small pitch, thus obtaining a great length of passage for the water and steam. On the interior surface of the tube is cast or otherwise formed a number of ribs $a'$, whereby the heat from the fuel is radiated and the heated gases are directed outwardly against the interior surface of the inner tube.

Fitting closely against the spiral prominences constituting the wall of the groove $a$ is another tube B, preferably constructed of mild steel, having a flange $b$ formed or screwed thereon which is bolted to the flange of the tube A, there being suitable packing $b'$ to insure a good joint. The exterior surface of the tube B is formed or provided with longitudinal ribs $b^2$, whereby a more ready absorption is obtained of the heat from the products of combustion.

The tubes A and B are inclosed by a tubular covering consisting of concentrically-arranged tubes C C', the annular space between them being filled with some suitable non-conducting material $c$. The space $c'$ between the casing and the longitudinally-ribbed tube B forms a flue for the hot gases and is divided longitudinally by partitions $c^2\,c^2$. A chimney $d$ rises from one end of the casing, a baffle $d'$, of fire-brick or other suitable material, being arranged beneath the chimney and in such a manner as to extend from the tube B to the cover D. The hot gases traverse the tube A and being baffled pass under the tube B to the opposite end, whence they rise and return along the upper side of the tube B over the baffle $d'$ to the chimney $d$.

The feed-water is conducted to the annular passage $a^3$, formed at the commencement of the groove $a$ in the tube A, by way of the pipe $a^2$, and from this annular passage $a^3$ gains access to the groove $a$, whereby it is caused to circulate about the tube and emerges into another annular passage $a^4$ at the opposite end of the groove $a$. From this latter passage the steam generated from the water is led by a pipe $a^5$ either direct to the engine or through a superheater coil E and then to the engine.

F is a coil to which the liquid fuel is conducted by way of the pipe F', which traverses the upper side of the flue $c'$, the fuel becoming vaporized in its passage through the coil and passing by way of the pipe $F^2$ in the under side of the flue $c'$ to a burner-regulator G. A pipe G', through which is fed either compressed air or steam, is placed in juxtaposition to the regulator G for the purpose of assisting in the proper mixing of the vaporized liquid fuel and air. To increase the intensity of the combustion, a ring-blower $G^2$ may be employed in conjunction with perforations $a^6$ in the ribs $a'$, the said perforations permitting the air from the blower to penetrate more effectually the flames. A pocket H, having perforations $h$, is arranged centrally in the tube A, and within the pocket a tube $h'$ is fitted, a space intervening between the exterior of the tube $h'$ and the interior of the pocket. By these means a proper admixture of the vaporized fuel and air is insured. For further increasing the efficiency of the combustion the air or steam fed through the pipe G' may be heated before entering the mixing-tube H by causing the same to pass through a coil arranged in the flue c'.

In order to start the apparatus, the receptacle I is filled with alcohol or benzin, some spirit being also placed between the ribs a'. The spirit is then ignited. As the flames get low spirit is admitted into the vaporizing-coil F, which has by this time become heated. The regulator G is then slightly opened, and the vapor from the vaporizer is blown into the mixing-tube h' and pocket H. From the latter it passes through the perforations h and becomes ignited by the flames from the burning alcohol (applied when starting) between the ribs a' of the tube A. The tube A will rapidly become heated, and in a very short time (a few minutes) water may be admitted into the groove a. The water while circulating through the groove a will generate steam. Compressed air or steam can now be admitted by way of the pipe G', and the blower $G^2$ may be started, the intensity of the combustion being thereby increased. During short stoppages the baffle d' will retain sufficient heat for heating the coil to vaporize the liquid fuel.

When very high power is required, several generators, such as above described, may be grouped together to form a "battery," economy in working resulting, because when running light the number of the generators may be reduced by shutting off those not required. These steam-generators may be arranged either horizontally or vertically and when required for use with self-propelled vehicles can be disposed beneath the flooring of the car.

What I claim as my invention, and desire to secure by Letters Patent, is—

1. A steam-generator comprising two concentric tubes arranged in contact with each other, a spiral groove in one of the tubes, means for supplying heating-gases to the interior of the inner tube, and an annular baffle projecting inwardly from the inner tube and arranged to direct the heating-gases outwardly against its inner surface, as set forth.

2. A steam-generator comprising two concentric tubes arranged in contact with each other, a spiral groove in one of the tubes, means for supplying heating-gases to the interior of the inner tube, and a series of annular baffles projecting inwardly from the inner tube and arranged to direct the heating-gases outwardly against its inner surface, as set forth.

3. A steam-generator comprising two concentric tubes arranged in contact with each other, a spiral groove in one of the tubes, means for supplying heating-gases to the interior of the inner tube, and a series of annular ribs in the inner tube and arranged to direct the heating-gases outwardly against its inner surface, as set forth.

4. A steam-generator comprising two concentric tubes arranged in contact with each other, a spiral groove in one of the tubes, means for supplying heating-gases to the interior of the inner tube, and a series of apertured, annular ribs in the inner tube and arranged to direct the heating-gases outwardly against its inner surface, as set forth.

5. A steam-generator comprising two concentric tubes arranged in contact with each other, a spiral groove in one of the tubes, ribs projecting inwardly from the inner tube and outwardly from the outer tube, and means for passing heating-gases successively in contact with the ribs of the two tubes, as set forth.

6. A steam-generator comprising two concentric tubes arranged in contact with each other, a spiral groove in one of the tubes, transverse ribs projecting inwardly from the inner tube and longitudinal ribs projecting outwardly from the outer tube, and means for passing heating-gases successively in contact with the ribs of the two tubes, as set forth.

7. A steam-generator comprising two concentric tubes arranged in contact with each other, a spiral groove in one of the tubes, means for supplying heating-gases to the interior of the inner tube, a jacket surrounding but spaced away from the outer tube, partitions dividing the intermediate space into two flues, a passage from the inner tube to one of the flues and a connection between the flues, as set forth.

8. A steam-generator comprising two concentric tubes in contact with each other, a capillary spiral groove in one of said tubes, said groove having its smallest dimension longitudinally of the tube, and means for directing heated gases outwardly against the interior surface of the inner tube, substantially as described.

In testimony whereof I have signed my name to this specification in the presence of two subscribing witnesses.

RANDOLPH MITCHELL OATES.

Witnesses:
E. ASSCHENBERGH,
EDW. KROEGER.